April 15, 1930.  M. LATOUR  1,755,121
MOTOR CONTROL SYSTEM
Filed May 19, 1928
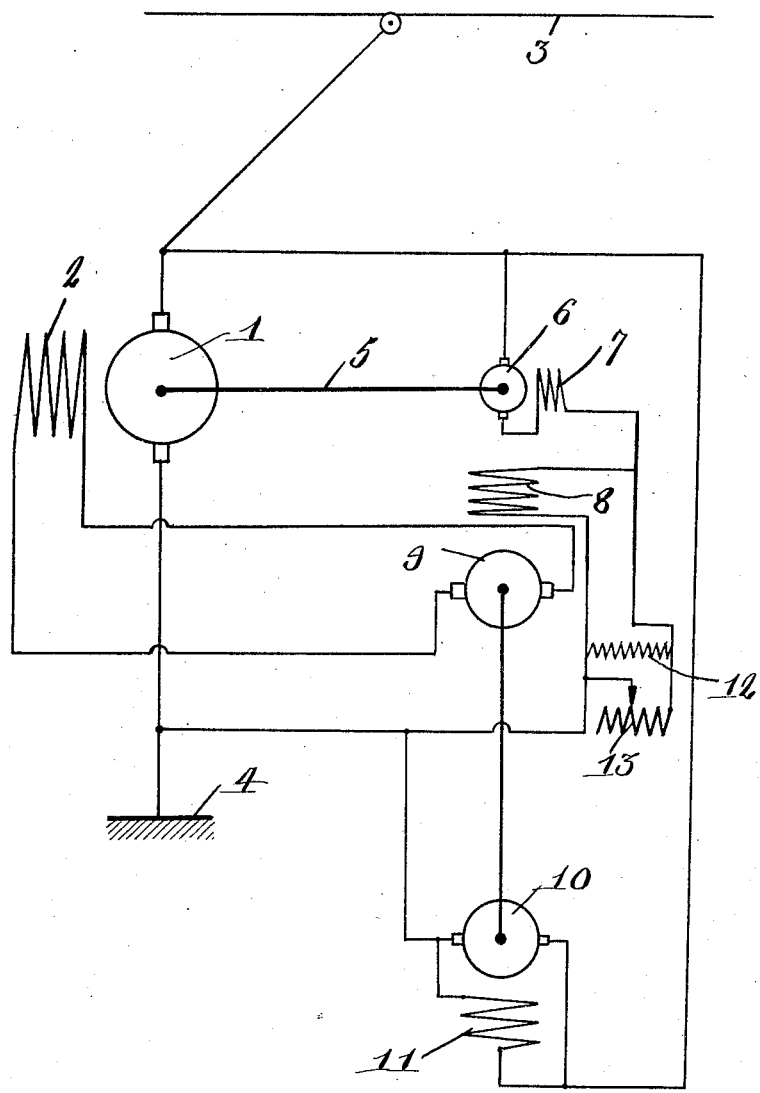

Patented Apr. 15, 1930

1,755,121

UNITED STATES PATENT OFFICE

MARIUS LATOUR, OF SAN SEBASTIAN, SPAIN

MOTOR-CONTROL SYSTEM

Application filed May 19, 1928, Serial No. 279,168, and in France May 20, 1927.

The present invention relates to a novel motor control system and has particular reference to a system for the excitation of continuous current motors.

The primary object of the invention is the provision of a motor control system adapted to maintain the excitation of the motor field winding at a predetermined constant value relative to the speed of the motor.

A further object of the invention is the provision of a motor control system wherein the special exciter is associated with a motor, particularly a traction motor so as to maintain the motor excitation at a predetermined constant value relative to the rotary speed of the main motor.

Another object of the invention is the provision of a motor control system embodying a main drive motor, means for exciting the field of the motor and an auxiliary series motor associated with the main motor and exciter so as to control the excitation of the main motor field winding.

Other objects and advantages of the invention will become apparent as the description progresses.

In the accompanying drawing forming a part of this specification and in which like reference characters are employed to designate corresponding parts throughout the same:

The figure is a diagrammatic illustration of the control system.

Referring to the drawing, the numeral 1 designates the armature and numeral 2 one field magnet winding of a traction motor, which winding is adapted to be fed by a separate device; the said armature and field winding forming the main motor of the present system. The armature 1 is connected in circuit with a trolley wire 3 and a return rail 4.

The armature 1 of the main traction motor is associated with a shaft 5 upon the opposed end of which is mounted the armature 6 of an auxiliary series motor having a field winding 7. Thus, the armature 6 of the auxiliary motor 6—7 may be directly driven by the armature 1 or through transmission gearing.

In series with the auxiliary motor 6—7 is connected the exciting winding of an exciter embodying a field winding 8 and an armature 9. The exciter is driven at a predetermined constant speed by means of an auxiliary drive motor embodying an armature 10 and a field winding 11. This auxiliary drive motor is preferably in the form of a continuous current shunt motor provided with a separate low tension commutator adapted to feed the field winding when the trolley voltage is too high.

Under the foregoing conditions, if the magnetic circuits of the auxiliary motor 6—7 and exciter 8—9 are below the saturation point, the current delivered to the exciting winding 2 of the main traction motor 1—2 by the exciter 8—9 will be proportional to the current traversing the auxiliary motor 6—7 and is therefore inversely proportional to the speeds of the motors 1—2 and 6—7 as the motor 6—7 is a series motor. In consequence thereof, when operating within the saturation limits, the motor 1—2 will, at all speeds, generate a constant E. M. F. proportional to the voltage of the trolley wire.

The current traversing the traction motor will thus remain practically constant notwithstanding the speed variations of the motor. Likewise, when the motors 1—2 and 6—7 are operating under saturation conditions it will be noted that if both the main motor and the auxiliary motor operate at higher current intensities under similar saturation conditions, the current in the exciting winding of the main motor will constantly retain the proper value and maintain a constant E. M. F. of the main motor when the speed decreases.

The field winding 8 may also be shunted by a resistor, illustrated at 12, the resistance of which increases directly with the temperature, that is, with the current intensity so that the excitation of the motor 1—2 increases excessively to maintain the E. M. F. generated by the traction motor constant. The armature current might then decrease when the field increases and the torque remain constant. Furthermore, the resistor 12 could comprise a carbon shunt wherein the resistance will decrease with an increase in temperature. Thus, by employing the resistor 12, the resistance of which decreases with the current intensity, the torque would decrease with the speed.

The regeneration or braking connection described in the foregoing may be advantageously employed for normal operation and the speed merely controlled by the shunting, more or less, of winding 8, that is, by regulating the field of the exciter 8—9 due to the instrumentality of a variable resistor 13.

Although the system herewith described is practically automatic in action, nevertheless it possesses peculiarities of its own, which it is believed might advantageously be pointed out. The drawing appended herewith represents diagrammatically a single traction motor, and from this showing any one skilled in the art of electric traction can easily visualize a plurality of such motors, as used in the usual known construction of railway engines and electric tramways, and wherein the various motors are adapted to be connected either in parallel or series. If this is considered for a moment, the motor 1—2 cannot be brought to a full stop without disconnecting the same from the line, because the system 6—7, 8, 9 and 2 cannot be possibly designed to produce a counter E. M. F. in 1 large enough to preclude the possibility of a heavy dangerous current traversing the same, even at extremely low speeds, the reason for the following explanations will be fully realized.

In a railway car or locomotive equipped with several traction motors 1—2, either having a corresponding number of auxiliary motors 6—7 or, another suitable arrangement (not shown), any change in series-parallel connections made simultaneously on the main traction motors and the auxiliary motors, or on whatever arrangement is used, shall automatically retain a proper exciting current for the main motors. It will also be noted that the changing from the parallel to the series connection or vice versa, must be effected at a certain predetermined speed for the reasons above stated. It can, however, be accomplished automatically by the provision of a centrifugal governor for instance, mounted on the shaft 5 of the motors 1—2 and 6—7.

As the current delivered to the auxiliary motor is a function of the speed it will also be controlled by the value of that current.

The previous description relating to the automatic changing of the series-parallel connection is also applicable to the insertion or short circuiting of resistors in series with the circuits of the motors 1—2 and 6—7 at low speed immediately above the starting period, although at exceedingly low speeds, this would be more effectively accomplished manually.

It is to be understood that the form of my invention herein shown and described is to be taken as a preferred example of the same, and that various changes as to the shape, size, and arrangement of parts may be resorted to without departing from the spirit of the invention or the scope of the subjoined claims.

Having thus described my invention, I claim:—

1. A motor control system comprising a main drive motor having an armature and a field winding, an exciting device for exciting the field of the motor, and an auxiliary series motor mechanically connected to the main motor and electrically connected with the main motor armature for keeping the main motor excitation at a predetermined constant relative to the speed of the main motor.

2. A motor control system comprising a main drive motor, means for separately exciting the field winding of the main motor, and a series motor mechanically dependent of the main motor and electrically connected with the exciting means and across the main motor so that the current passing through its armature will correspondingly control the exciting means in a substantially reverse ratio to the speed of the main motor.

3. A motor control system for traction motors comprising a drive motor to the armature of which a source of electric energy is connected, a separately driven exciter for exciting the field winding of the main motor and having a field winding, an auxiliary series motor coupled to the drive motor and connected across the main motor in series with the exciter field winding, and means connected across the field winding of the exciter for varying the excitation constant of the main motor.

4. A motor control for electric traction motors, comprising a traction motor having a field winding and exciter for exciting the field winding of the traction motor, and a series motor driven by the traction motor and connected electrically with the traction motor and exciter whereby the excitation of the traction motor is substantially inversely proportionate to the speed.

5. A motor control system for traction motors comprising a main drive motor having a field winding and an armature, an exciter for exciting the field winding of the drive motor, a field winding for said exciter, an auxiliary series motor mechanically connected to the armature and dependent thereon, said auxiliary motor being connected across the drive motor armature and in series with the exciter field winding, and a variable resistance across the field winding of the exciter.

6. In a control system for electric traction motors, the combination with a traction motor comprising a separately excited field winding and an exciter therefor of a small series motor mechanically dependent of the traction motor and connected across the terminals of the traction motor in series with the exciter field.

7. In a control system for electric traction motors, a main traction motor comprising a separately excited field winding, means for exciting said motor, and a small series motor mechanically associated with the traction motor and electrically connected with the exciting means so as to keep the excitation of the main motor at a predetermined constant relative to the speed thereof.

8. In a control system for electric traction motors, a main traction motor having an armature and a separately excited field, an exciter for the traction motor and having a field winding, a small series motor actuated by the main motor and connected across the armature of the traction motor in series with the field of the exciter, and means shunted across the said exciter field to alter the main motor excitation constant.

In witness whereof I have hereunto set my hand.

MARIUS LATOUR.